Patented Aug. 24, 1954

2,687,175

UNITED STATES PATENT OFFICE 2,687,175

GELLED HYDROCARBON AND USE THEREOF

Everett A. Johnson, Park Ridge, Ill., assignor to Standard Oil Company, Chicago, Ill., a corporation of Indiana No Drawing. Application October 17, 1950,
Serial No. 190,653

7 Claims. (Cl. 166—42)

This invention relates to improved hydrocarbon gel compositions of high viscosity and gel strength. It pertains more particularly, however, to improved methods and means for using such gels as hydraulic fracturing media in producing channels in earth formations to increase the productivity of fluids from strata traversed by an oil or gas well.

Many methods have been heretofore proposed for increasing the drainage area within a selected producing zone of an oil or gas well. However, each of the prior art processes is limited in its effectiveness for extending drainage channels or fractures any appreciable distance into well formations. However, recently a process has been developed for hydraulically fracturing the selected formation to produce channels therein by pumping a soap-gelled gasoline into the well, producing channels within the formation by applying pressure to the soap-gelled gasoline and subsequently removing the gel from the resulting fracture preliminary to producing the well. Such a process is described, for example, in the Oil and Gas Journal, vol. 47, No. 24, page 76 et. seq. (October 14, 1948).

In such hydraulic fracturing of a formation traversed by a well, it is important that the hydraulic fluid does not penetrate into the formation too rapidly because this would preclude attaining the necessary fracturing pressure. Therefore the development of the process has gone in the direction of employing fluids which are as viscous as practicable, i. e. fluids which have low liquid loss under pressure. However, it is necessary to remove the hydraulic fluid from the fracture and if it is too viscous and stable a gel it tends to remain in the fracture and plug the producing formation. In minimizing these difficulties, a gel of lower soap concentration and lower viscosity than would otherwise be preferred has been used for the fracturing operation. Thus the gelling agents heretofore used are subject to certain disadvantages in that the amount of gelling agent must be carefully controlled to provide a pumpable gel of the required low penetrating properties but one which can nevertheless be broken. Accordingly, it is an object of this invention to provide a hydraulic liquid which will not flow freely into the formation at low pressures but which can nevertheless be reduced in viscosity under controlled conditions so that it can readily be removed through the well. A more specific object is to provide a low penetrating fluid for the fracturing of well formations which is stable under pressure and yet may be readily removed from a formation fracture. An additional object is to provide a hydraulic fluid having an optimum viscosity and a minimum tendency to plug the formation. A further object is to provide an improved hydrocarbon gelling composition which is comparable in peak viscosity to high concentrations of aluminum soap. A specific object of the invention is to provide an improved system for fracturing a formation without premature penetration of the formation by the hydraulic fracturing liquid and to provide a gelled hydraulic fluid, the residue of which renders the produced fracture preferentially oil wettable. These and other objects of the invention will become apparent as the description thereof proceeds.

In accordance with my invention, the difficulties encountered with high concentration soap gels are avoided by employing as a gelling agent for the low penetrating hydrocarbon liquid a mixture of an alkali metal soap of mixed organic acids and carbon black. By using a selected proportion of soap at attain a moderate gel structure producing an appreciable viscosity which can be readily reduced by known gel breakers and incorporating a substantial proportion of acetylene black to the partially gelled hydrocarbon, I obtain a hydraulic fluid which has unusual and desirable properties. A transient high viscosity is attained by a combination of the soap and acetylene black which is approximately equivalent to the viscosity obtainable by a concentration of soap corresponding to the total percentages of the soap and acetylene black added to the hydrocarbon liquid. Yet the mixture is of lower liquid loss than a gelled hydrocarbon of the same viscosity wherein all of the gelation is due to soap. When the gel characteristics due to the soap alone are reduced by conventional techniques, the viscosity attributable to the lacey structure of the acetylene black is likewise destroyed. Therefore, the total transient viscosity is reduced with the same simplicity or ease as a soap gelled hydrocarbon of such low soap concentration as to be unsatisfactory for the hydraulic fracturing of well formations. Furthermore, the deposition of the acetylene black from the soap gelled hydrocarbon on the face of the fractured channel renders the channel preferentially oil wettable.

The type of acetylene carbon black which is used as a bodying agent for the partially gelled organic liquids is one of the type of carbon blacks commonly termed the "structure blacks." This term has particular reference to those carbon blacks which have an abnormally high structure index as defined in an article by Sweitzer and Goodrich in "Rubber Age" for August 1944, page 469 and particularly page 470. This index is a measure of the oil absorption capacity of carbon black. Acetylene black shows a very high index of about 300 as compared with 100 for ordinary channel blacks.

Carbon blacks of high structure index form smooth colloidal type gels and impart to the partially gelled hydrocarbons a thickening effect due to the reticulate or lacey structure. Examples of this class of carbon blacks are those obtained by the thermal decomposition of unsaturated hydrocarbons such as acetylene, or produced in the electric arc treatment of petroleum fractions.

Acetylene black has abnormal oil absorptive- and structure-forming properties and these blacks appear to form groups of particles in branched chains to produce a reticulate or lacey structure in the gelled hydrocarbons. It appears that such carbon blacks tend to group in clusters or chains.

These carbons apparently form colloidal gels and fortify a gelled hydrocarbon such as gelled gasoline to increase the viscosity and decrease the liquid loss from the gel under pressure. Particular members of the class are acetylene black and various channel blacks prepared from natural gas.

From the above, it will be understood that the structure blacks suitable for use in my invention in conjunction with mixed alkali metal soaps of the "Napalm" and "Nuogel" type are different from the conventional carbon blacks which have been widely used commercially in lubricants. The latter which comprised graphite, lamp black, and relatively large-size particulate channel carbon blacks, form only suspensions in oils, whereas the structure blacks in conjunction with the alkali-metal soap form a colloidal composition within the gel structure. This difference is due largely to the physical structure and arrangement of the acetylene carbon black particles within the hydrocarbon gel produced by the mixed alkali metal soaps.

It has been found that the acetylene black has a definite reticulate structure and, in general, the particle size of the blacks suitable for use in my invention is between 40 and 50 millimicrons. The particles are generally spherical in shape and have an average diameter of about 45 millimicrons and appear to connect in long chains to produce a structure which reinforces the alkali metal soap gel. They apparently form an interlocking reticulate network structure which runs through the gelled hydrocarbon and retains the liquid hydrocarbon in a stable manner. The acetylene black, however, is easily dispersed in the hydrocarbon vehicle by ordinary means such as a stirred kettle.

In the present invention the low penetrating fluid can be produced by gelling an organic liquid such as for example crude or refined hydrocarbons, i. e. gasoline, kerosene, naphtha, fuel oil, diesel oil, as well as animal and vegetable oils. A suitable primary bodying or gelling agent is a material such as the soaps or salts of fatty acids. Soap produced by or from ammonia or any metal of the alkali metal and alkali earth metal groups such as, for example, magnesium, calcium, lithium, lead or aluminum combined with a fatty acid produces a suitable primary bodying agent. The fatty acid component is preferably one of the aliphatic acids having at least one carboxylic group in aliphatic chain linkage, the aliphatic chain preferably having at least 12 carbon atoms. Suitably fatty acid compounds which are commercially available are, for example, coconut oil fatty acids, peanut oil fatty acids, polymer oil fatty acids, stearic acid, maleic acid, palmitic acid and the like.

Although the salts of fatty acids, in general, are suitable bodying agents for producing a gelled hydrocarbon for use in my invention, I prefer a metal soap such as an hydroxy aluminum soap which has the ability to form hydrocarbon gels at ordinary temperatures. A particularly useful soap of this type is known as "Napalm" soap which consists of a mixture of distinct components. One is an aluminum soap of a saturated fatty acid and the second is an aluminum soap or soaps selected from the group including soaps of cycloaliphatic and unsaturated acids, i. e. soaps such as aluminum naphthenate, oleate, oleate-linoleate or the like. The combination of an aluminum soap of the fatty acid type with one or more soaps of the naphthenate or oleate type gives a thickening or bodying agent of distinct and superior properties not obtained with either component alone.

Both viscosity and filtrate rate are indicative of the ability of a fracturing fluid to resist penetration of the formation prior to fracturing the formation. In general, with a given soap gel, the viscosity is affected to a large extent by the temperature of the formation which it is desired to fracture. Formation temperatures may ordinarily range from about 100 to about 210° F., the average temperature usually being in the range of about 140° F. Such temperature conditions, i. e. about 140° F., normally require gels having bodying agents incorporated therein to the extent of about 5 wt. percent. However, at higher temperatures increased quantities of bodying material may be necessary and at temperatures of the order of 210° F. the bodying agent may be in a concentration of about 10 wt. percent to yield a gel having the desired characteristics. When such gel is produced by the metal soaps alone, the liquid is so very stable that it is difficultly removable from the formation. However, when between about 50% and 300% of the alkali metal soap of fatty acids is replaced by structural black according to my invention, a gel is formed which not only has a higher viscosity at a given temperature level but lower fluid loss. The resistant gel is readily broken, since it is only necessary to reduce the gel properties produced by the soap component of the bodying agent in order to effect a collapse of the gel structure.

The filter rate is an important measure of the ability of a fracturing fluid to resist penetration of the formation and is applicable to fluid suspensions containing solid props as well as the gelling agent comprising a metal soap and strutural blacks. The filter rate of the fracturing liquid is customarily defined as the volume of liquid collected in a unit time when a measured sample of the gelled fluid is placed in a stand-and cylinder closed at the bottom by a supported filter paper and applying a gas pressure of 100 pounds p. s. i. to the surface of the fluid. Hydraulic compositions normally regarded as satisfactory for fracturing formations of the type herein contemplated should exhibit a fluid loss or filtrate rate of 100 cc. or less, preferably 50 cc. or less from a 600 cc. sample in 30 minutes when supported by a Whatman #50 filter paper as determined in accordance with the apparatus and procedure described in API Code No. 29, 2nd edition, July 1942 (tentative).

Gelation ordinarily occurs in from about 15 seconds to about two hours and gels having suitable filtrate rate and viscosity are produced within from about 30 seconds to about three hours. Normally from about 2.0% to about 6% by weight of the aluminum soaps of fatty acid based on the weight of the liquid and between about 2% and 6% structural black produces a gel which is suitable for fracturing most formations. The total mixed bodying agent, however, preferably comprises between about 4% and 10 wt. percent of the liquid.

To further illustrate the ability of the structural blacks to fortify the viscosity and filtrate rate characteristics of a partially gelled hydrocarbon, gels were prepared using acetylene carbon black and Napalm in kerosene. The properties of this gel were compared to a straight alkali metal soap gel and a straight acetylene black composition. The results are given in Table I.

*Table I*

| Composition of Gels | Maximum Viscosity in cps. | Fluid Loss in 7.5 Min., cc. | Viscosity in cps. after Addition of Gel Breaker |
|---|---|---|---|
| 5% Acetylene Black | 300 | Dehydrated | |
| 6% Alkali Metal Soap | 1,400 | 20 | 14 |
| Mixture of 3% Alkali Metal Soap and 3% Structural Black | 1,780 | 5 | 30 |

These data indicate that although an acetylene black gel has a high fluid loss and low viscosity, a combination of alkali metal soap and acetylene black gives a low fluid loss. Tests further indicate that a mixture of 3% Napalm and 3% acetylene black has a higher peak viscosity and better fluid loss than a 6% Napalm gel.

An important additional characteristic of a gel suitable for use in the hydraulic fracturing of wells is to have a "reach bottom viscosity" of at least 50 poises. Tests were conducted to determine the "in-hole viscosity" of the soap-black mixtures which have a satisfactory maximum viscosity. In Table II a tabulation is given wherein conditions obtained in a 6000-foot well were simulated with a bottom hole temperature of 140° F.

*Table II*

| Composition of Gel | "In-hole Viscosity" |
|---|---|
| 2% Alkali Metal Soap and 5% Acetylene Black | 54 |
| 1.33% Alkali Metal Soap and 6.66% Acetylene Black | 27 |
| 5% Alkali Metal Soap | 57 |

The data in Table II show a 5% soap gel which has been accepted for field practice in the hydraulic fracturing of wells. It has an in-hole viscosity in excess of 50 cps. and has been found satisfactory for field use. The 6.66% acetylene black—1.33% alkali metal soap gel is unsatisfactory, since it has an in-hole viscosity substantially below the minimum 50. However, the data indicate that a gel consisting of 5% acetylene black and at least 2% alkali metal soap meets the necessary requirements, i. e. the gel has a viscosity of more than 50 cps. at "reach bottom time" and is comparable to the straight alkali metal soap gel. However, the acetylene black-soap mixture has the advantage of higher maximum viscosity on a weight-per-weight basis and also a very much lower fluid loss, i. e. 20 cc. vs. 5 cc. under identical conditions.

In addition to the technical advantages of the soap-carbon black gel is that the substitution of acetylene black for the soap materially reduces the cost of the gel, the soap gelling agent costing about two and one-half times as much as the acetylene black. However, acetylene black alone cannot be used as a full substitute for soaps in gels adapted for use under high pressure. Gels made with ungelled petroleum fractions and acetylene carbon black have a satisfactory viscosity but separate on filtration with a high fluid loss, and the suspension is generally unsuited for use in hydraulic fracturing operations. In some instances, however, other types of gelling agents, such for example, as salts of aliphatic xanthates, can be used to produce the base gel to which the structure blacks are added to produce the composite gel of desired viscosity and gel strength.

I have found that at least 2% alkali metal soap of fatty acids is necessary in the composition to prevent separation of the hydrocarbon liquid such as kerosene from the gel. On the other hand less than about 6% soap should be used to avoid excessive pumping pressures. When small proportions of between about 2 wt. percent and 6 wt. percent of a structural black such as acetylene carbon black is incorporated with 2% soap to form a gel, the peak viscosity and a low filter rate ordinarily obtainable only with an objectionably high concentration of soap are attainable. Nevertheless, such a soap gel fortified with structural black is easily resolved by the addition of gel breakers as shown in Table II.

In a typical operation, the zone or formation is isolated by one or more packers which may be of mechanical or hydraulically inflatable type. The hydraulic fracturing fluid consisting of, for example, gasoline which has been gelled by a mixture of about 3% Napalm soap and about 3% acetylene black, is pumped into the isolated zone and pressure applied to the fluid.

It is desired that the gelled fluid contain a propping agent suspended therein so that once a fracture is formed in the formation its closing is prevented by the propping agent and a channel which is permeable to the well fluid is produced. Suitable propping agents are materials such as plaster sand or other finely divided props having a particle size of about 16 mesh. Between about 0.5 and about 10 pounds of such propping agent per gallon of viscous gel may be used. The suspension when placed opposite the formation tends to stay with the well and upon continued pumping of fluid into the well, high pressure is built up due to its inability to penetrate the formation. Sufficient pressure, e. g. 1000 to 3000 p. s. i. or as high as 15,000 p. s. i. is applied to the gel fluid within the well until the "formation breakdown pressure" is reached. Ordinarily, this pressure is equal in pounds per square inch to about 0.8 times the depth of the formation being treated. For the purpose of applying the pressure to the gelled fluid, a liquid such as ungelled gasoline or crude oil can be pumped into the well.

After the formation breakdown pressure has been exceeded, the surface pressure decreases abruptly and levels off at a substantially constant value upon the continued injection of the fracturing fluid.

After fractures of substantial area have been produced, the gel may be broken by treatment with a solution of an oil-soluble sulfonate to destroy the gel structure due to the soap component.

This reduction of the gel viscosity results in the production of a low viscosity liquid which is not fortified by the presence of the structural black. Accordingly, the entire viscosity due to the gelling by the soap and the fortifying of the soap gel by the structural black is quickly and effectively reduced.

Although I have described my invention in terms of specific examples which are set forth in considerable detail, it should be understood that these are by way of illustration only and that the invention is not limited thereto since alternative embodiments and operating techniques will become apparent to those skilled in the art in view of my disclosure. Accordingly, modifications of my invention are contemplated without departing from the spirit of the described invention or the scope of the appended claims.

What I claim is:

1. The method of increasing productivity of wells which comprises the steps of injecting into the well a hydrocarbon gel comprising kerosene to which has been added an equal mixture of aluminum fatty acid soaps and acetylene carbon black, said mixture comprising between about 4 and about 10 wt. percent of the hydrocarbon liquid, applying hydraulic pressure to the hydrocarbon gel sufficient to fracture a formation traversed by the well, flowing at least a portion of the hydrocarbon gel into the fracture, reducing the viscosity of the hydrocarbon gel due principally to the presence of the aluminum fatty acid soap to produce a liquid hydrocarbon of decreased viscosity incapable of supporting an acetylene black gel, and withdrawing the said liquid from the fracture.

2. A method of producing a propped channel in a stratum traversed by a well bore which comprises the steps of confining a gelled hydrocarbon fluid suspension of formation props adjacent said stratum, said gelled hydrocarbon comprising kerosene containing between about 4 and about 10 wt. percent of a mixture of acetylene black and aluminum fatty acid soaps, the acetylene black comprising from 50 to 300 weight percent of the soap, applying to said confined suspension sufficient pressure to fracture said stratum, flowing into said fracture at least a portion of said gelled hydrocarbon fluid suspension of props, decreasing the gel properties of said gelled fluid due to the aluminum fatty acid soaps to produce a liquid of such low viscosity as to not support a carbon black gel, thereby destroying the incremental gel structure due to the carbon black alone and permitting the props to settle from the liquid within the fracture, and withdrawing the substantially prop-free fluid from the fracture.

3. A method for increasing gelation of a partially gelled hydrocarbon liquid comprising kerosene containing between about 2 and about 6 wt. percent of an aluminum soap bodying agent which comprises adding to the mixture of hydrocarbon liquid and bodying agent between about 300 and 50 wt. percent of structural black based on the weight of said bodying agent.

4. A composition of matter of high viscosity and low liquid loss prepared by adding to gasoline from about 4.0 to about 10 wt. percent of a bodying agent consisting essentially of about 50% alkali metal soaps and about 50% acetylene carbon black which together function as a gelling agent for said gasoline.

5. A composition of matter comprising an organic gel prepared by adding to a hydrocarbon liquid from about 4 to about 10 wt. percent of a bodying agent consisting essentially of from about 2 to 6 percent of aluminum soap and 2 to 6 percent of structural black which black functions as a gel fortifier for said soap in gelling the hydrocarbon liquid.

6. The method of increasing the productivity of a formation traversed by a well bore which comprises placing in said bore a gelled kerosene containing a gelling agent consisting essentially of a mixture of 3 weight percent acetylene black and 3 weight percent aluminum fatty acid soaps, applying hydraulic pressure to said gelled kerosene sufficient to fracture the traversed formation, injecting at least a part of said gelled kerosene into the produced fracture, contacting the injected gelled kerosene within said fracture with a fluid capable of substantially destroying the gel properties of the injected gelled kerosene due to the soap component alone, continuing the application of pressure to the partially gelled kerosene whereby the transient gel structure due to the structural black is collapsed, and withdrawing the kerosene and excess black from the fracture to provide a permeable channel extending from said well bore into said traversed formation.

7. A composition of matter of high transient viscosity and low liquid loss under pressure prepared by adding to kerosene about 3 weight percent of an alkali metal soap and about 3 weight percent acetylene carbon black.

References Cited in the file of this patent

UNITED STATES PATENTS

| Number | Name | Date |
|---|---|---|
| 2,379,516 | Garrison | July 3, 1945 |
| 2,487,260 | Morway | Nov. 8, 1949 |
| 2,522,460 | Morway et al. | Sept. 12, 1950 |

OTHER REFERENCES

Clark: Hydrafrac Process, article in Oil and Gas Journal, October 14, 1948, pages 76–78 and 103.